(12) United States Patent
Amron et al.

(10) Patent No.: US 6,796,041 B2
(45) Date of Patent: Sep. 28, 2004

(54) SYSTEM FOR OPERATING ONE OR MORE LASERS TO PROJECT A VISIBLE LINE ONTO A GRASS-COVERED SURFACE

(75) Inventors: Alan Amron, Syosset, NY (US); Brian K. Dinicola, Monroe Township, NJ (US)

(73) Assignee: First Down Laser Systems, LLC, Las Vegas, NV (US)

( * ) Notice: Subject to any disclaimer, the term of this patent is extended or adjusted under 35 U.S.C. 154(b) by 18 days.

(21) Appl. No.: 10/385,219

(22) Filed: Mar. 10, 2003

(65) Prior Publication Data

US 2004/0111905 A1 Jun. 17, 2004

Related U.S. Application Data

(63) Continuation-in-part of application No. 10/320,304, filed on Dec. 16, 2002.

(51) Int. Cl.[7] .............................................. G01C 15/06
(52) U.S. Cl. ........................................ 33/289; 473/490
(58) Field of Search ........................ 33/227, 286, 289, 33/DIG. 21; 473/415, 490

(56) References Cited

U.S. PATENT DOCUMENTS 3,300,861 A * 1/1967 Lilly ............................ 33/289
3,741,662 A * 6/1973 Pioch .......................... 473/490
3,752,588 A * 8/1973 Chapman .................... 33/289
4,090,708 A * 5/1978 McPeak ....................... 33/289
5,976,039 A * 11/1999 Epel et al. ................. 473/490
2002/0151385 A1 * 10/2002 Hemphill .................... 473/415
2002/0178596 A1 * 12/2002 Malard et al. .............. 33/286

* cited by examiner

*Primary Examiner*—G. Bradley Bennett
(74) *Attorney, Agent, or Firm*—Brian K. Dinicola (57) ABSTRACT

An apparatus for providing at least one temporary visible line on a surface within the view of at least one video camera. The system comprises a first laser source disposed at a first elevated, stationary location relative to the surface, and a second laser source disposed at second elevated, stationary location relative to the surface. The output of each laser source is synchronously deflected so as to repetitively sweep each output beam across the same region of the surface and thereby project a visible composite line that is, for example, transverse to the lateral sidelines of an athletic field. A controller comprising a synchronization module synchronizes the sweep frequency rate, at which the beams sweep the surface, to a scan rate of at least one camera arranged to receive an image of the composite temporary line.

20 Claims, 4 Drawing Sheets

SYSTEM FOR OPERATING ONE OR MORE LASERS TO PROJECT A VISIBLE LINE ONTO A GRASS-COVERED SURFACE

REFERENCE TO RELATED APPLICATIONS

This application is a continuation-in-part of U.S. patent application Ser. No. 10/320,304 filed on Dec. 16, 2002 and entitled "SYSTEM AND METHOD FOR DYNAMICALLY MARKING ATHLETIC FIELDS USING A HAND-HELD INTERFACE".

This application is also related to co-pending U.S. patent application Ser. No. 10/385,218 filed simultaneously herewith and entitled "SYSTEM AND METHOD FOR OPERATING GROUPS OF LASERS TO PROJECT A VISIBLE LINE OF DEMARCATION WITHIN DISCRETE REGIONS OF AN ATHLETIC FIELD".

BACKGROUND OF THE INVENTION

1. Field of the Invention

This invention relates generally to the use of visible reference lines during sporting or entertainment events and, more particularly, to systems employing at least one laser light beam source to generate such visible reference lines.

2. Discussion of the Background Art

To accommodate a sporting event, a series of reference and/or boundary lines may be defined upon a grass-covered surface using, for example, paint, powders, dyes and the like. Such methods of marking are entirely satisfactory so long as the reference lines themselves are static during the entire event. Where the position of a boundary or other line of demarcation changes dynamically during the event, however, markings of the permanent type cannot be used.

In the game of football, for example, a key objective of the team in possession of the ball (i.e., the "offense") is to retain possession of that ball by moving it far enough down the field. Specifically, the offense is given a set of four plays or "downs" to advance the ball by at least ten yards. Each time that distance is reached or exceeded, the offense is said to have crossed a "first down" line, a new set of downs is earned, and the offense is allowed to continue its advance toward the goal line of the opposing team (i.e., the "defense"). If the offense falls short, however, possession is lost and the two teams reverse their roles. A regulation football field has a length of 100 yards and 53 yards. Thus, by way of example, a team gaining possession of the ball at its own 20 yard line must move the ball a total of eighty yards in order to reach the end zone of the opposing team.

In numerous occasions throughout an average football game, the officials of the game must resort to sideline markers to establish whether the offense has advanced the ball by the required distance. The standard alignment system that is utilized is generally a pair of poles connected by a 30-foot long chain. The relative position of the football is measured by locating a first of these poles at the approximate location of the initial line of scrimmage and moving the second as far forward as possible. Each time this measurement is made, the game must be delayed and the yard markers must be carried from the sidelines to the place on the field where the official has "spotted" the ball. Although the game of football has become a relatively complex sport, involving literally hundreds of millions of invested dollars, this time consuming system has remained relatively the same since the conception of the sport.

A number of approaches intended to ameliorate the aforementioned deficiencies have been proposed over the years, but none of them has met with any degree of commercial success. U.S. Pat. No. 3,741,662, entitled "VISIBLE LINE MARKER" and issued to Pioch on Jun. 26, 1973, U.S. Pat. No. 3,752,588, entitled "LASER FOOTBALL FIRST DOWN MEASURING DEVICE" and issued to Chapman on Aug. 14, 1973, and U.S. Pat. No. 4,090,708 entitled "APPARATUS FOR MARKING FOOTBALL FIELDS" and issued to McPeak on May 23, 1978. Each of the aforementioned patents involves the use of lasers for the purpose of marking visible lines of demarcation on an athletic field. One of the principal drawbacks of these systems is the time-consuming and tedious method of operation.

Both Chapman and Pioch involve the use of track mounted, sliding projectors that are located at the sidelines and just a few feet above the field level. The lasers are mounted for oscillation in a vertical plane and the projected low intensity beam developed by each must strike the field at points of reference lying on an imaginary line of demarcation defined by the intersection of the vertical plane with the field surface. Accordingly, it is necessary for the operator to manually position the projector for each reference point established. Like Pioch and Chapman, McPeak discloses the use of a laser assemblies adapted to accommodate sliding movement along the sidelines of a football field. McPeak, however, teaches that two oppositely directed beams should be aimed at a level above (i.e., "adjacent and parallel to") the field surface.

Another drawback associated with the aforementioned systems is that the low-intensity output of these lasers is far too low to be visible by the players, let alone by an audience in, for example, a stadium setting. Indeed, the aforementioned systems are intended for use only in making a first down measurement determination after each close play. As it turns out, players intent on getting the ball past the first yard line—and focused on the sideline markers long enough to be "blindsided" by the defense—have either fumbled the ball or suffered very serious neck and back injuries.

Television networks have recently implemented an image pre-processing system which allows viewers of televised football games to see a so-called "virtual" first down line that digitally projects, in real time, a visible line onto video frames recorded by the television camera, the line being displayed on a viewer's television set so that it appears to extend between the first down sideline markers. Unfortunately, neither the players, game officials, nor the fans attending such games can actually see this virtual line. It is thus reasonable to conclude that given the rapid and widespread adoption of a virtual visible line marking system—whose enjoyment is strictly limited to television viewers, it has heretofore been assumed that it would be impossible or impracticable to project a real, visible line onto surfaces like those of athletic fields. Although there are many possible explanations for this conclusion, it is believed by the inventors herein that the poor light scattering properties of grassy surfaces is at least partially to blame. Blades of grass are randomly oriented and tend to scatter incident light in several directions. The inventors herein have discovered that from distances in excess of one hundred feet or so, a single beam of even relatively high intensity (e.g., 40 joules/second) will be reflected in such a way that it cannot be seen from most camera or fan viewing angles within a stadium.

A continuing need therefore exists for a visible line marking system that is simple to operate, accurate enough to allow its use by officials at sporting events, and of sufficient intensity to be viewed by players, large audiences, and television viewers alike.

A need also exists for a system capable of projecting a variety of other images, onto surfaces having non-uniform light scattering properties, which can be seen from different perspectives and from considerable distances even in daylight conditions.

SUMMARY OF THE INVENTION

The aforementioned needs are addressed, and an advance is made in the art, by an apparatus for providing at least one temporary visible reference line on a surface, as for example, an athletic field, within the field of view of at least one video camera. An illustrative system constructed in accordance with the present invention comprises a first laser source disposed at a first elevated, stationary location relative to the surface, the first laser source being operative to emit a first laser beam having a wavelength of between 400 nm and 750 nm and to sweep the first laser beam along a selectable path upon the surface so as to form a temporary line thereon. The system further comprises a second laser source disposed at a second elevated, stationary location relative to the surface and different from the first stationary location, the second laser source being operative to emit a second laser beam having a wavelength of between 400 nm and 750 nm and to sweep the second laser beam across the selected path so as to form, with the first laser beam, a composite temporary visible line as, for example, a line of demarcation during a football game. A controller comprising a synchronization module is operatively associated with the first and second laser sources and is adapted to synchronize the sweep frequency rate—at which the first laser beam and the second laser beam are swept across the surface of the field—to a scan rate of at least one camera that is arranged to receive an image of the composite temporary line.

In accordance with an illustrative NTSC-compliant embodiment of the present invention, the sweep frequency rate of the beams and the camera scan rate are both 30 Hz. Alternatively, the camera scan rate may be a sub harmonic of the sweep frequency rate. Assuming NTSC compliant operation, the sweep frequency rate may be an n multiple of the 30 Hz camera scan rate, where n is a whole integer greater than one. In a professional or collegiate football setting, such synchronization allows television viewers to enjoy a flicker-free display of the same visible line as that seen by the players, game officials and fans in attendance. The synchronizing module can be adapted either to synchronize the scan rate of the at least one camera to the sweep frequency rate of the first and second laser sources, or to synchronize the sweep frequency rate of the first and second laser sources to a scan rate of the first and second laser sources.

It is expected that the power delivery requirements for each laser source can vary considerably for each installation, depending upon such variables as the range of expected ambient lighting conditions, the distance each beam must traverse before contacting the surface, and the actual width dimension of the line to be displayed. For a line width of approximately 3 to 6 inches (8 to 15 cm), excellent results have been achieved from distances in excess of several hundred feet using two 40W, frequency doubled, Q-switched Nd:YAG lasers each adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to he human eye). Thus, such an argon laser would have to deliver up to three or four times as much power to match the visibility of an Nd:YAG laser.

To move its respectively generated laser beam along a selectable path on a target surface so as, for example, to produce a straight line connecting the two lateral sides of a football field, each corresponding laser source includes a scanning assembly capable of deflecting the beam as required to generate the composite line. By way of illustrative example, the scanning assembly for each laser source may include an X-Y galvanic scanner. The controller is responsive to user input commands to move the composite temporary line from a first selectable path on the surface to a second selectable path on the surface. Where the installation is to provide a line of demarcation in a football game, this can include moving the temporary visible line forward from a first down line of scrimmage—where an official has just "spotted" the ball—by a distance of ten yards to thereby display the new first down line. This can also include moving the temporary visible line from an old line of scrimmage, forward or backward, to a new line of scrimmage as a result of a penalty assessed against one of the teams.

Under certain ambient lighting and other installation conditions, it is contemplated that a surface may be divided into multiple regions or zones. This allows the distance over which each beam must travel to be kept within a range that is consistent with the intensity, divergence and line width demands for proper viewing and accuracy. By way of illustrative example in which the surface is a football field that is subject to bright daylight illumination conditions, the first and second laser sources may be positioned beyond and above opposite lateral sides of the 25 yard line on one-half of the field, while third and fourth laser sources may be positioned beyond and opposite lateral sides of the 25 yard line on the other half of the field.

It should be emphasized that there is no requirement that any pair of lasers be located along a line transverse and perpendicular to the lateral sidelines of the field. Thus, for example, the first laser source might be beyond and above the twenty-yard line of a first lateral side of the field and the second laser source might be beyond and above the thirty-yard line of the second lateral side. Still another laser source might be at the ten-yard line of either the first or the second line, such that all or any two of them may be used to generate the composite line. Preferably, however, the various laser sources are arranged so as to cause the incident light from different beams to be scattered in a way that allows spectators from as many different viewing angles as possible to see the line clearly. In that regard, there is no requirement that the respective laser sources be located at the same elevated vertical position relative to the field. Needless to say, it is considered within the level of skill of the ordinary artisan to obtain, whether empirically or by predictive modeling, a juxtaposition of laser sources that is ideally suited to the specific lighting conditions and overall dimensions associated with any particular indoor or outdoor location.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The invention will be better understood by reference to the detailed description of the invention that follows, taken in conjunction with the accompanying drawings, in which.

DETAILED DESCRIPTION OF THE INVENTION

The present invention is based, in part, on the recognition that even non-smooth surfaces can reflect incident beams of coherent light in a way that allows a line projected thereby to be seen from most radial viewing perspectives. As used herein, the phrase "non-smooth target surface" is intended to encompass any surface that is characterized by a tendency to scatter incident light in a random and non-uniform manner. In connection with the exemplary football stadium installation depicted in FIGS. 1 and 2, it will be understood that the term "non-smooth target surface" refers to the surface of an athletic field that is entirely or substantially covered by real or artificial turf grass. By appropriate beam wavelength, output power level selection, and placement of multiple laser sources, the poor light scattering performance of such non-smooth surfaces can be overcome so that spectators can easily see the line(s) so-projected from most, if not all, vantage points within the seating area of a stadium or arena—even in peak daylight ambient lighting conditions.

It should thus be understood that although the exemplary embodiments illustrated and described herein relate specifically to the projection of a visible straight line onto the grass surface of a football field, the teachings of the present invention are equally applicable to the projection of other types of lines—including images, logos, advertising messages, and the like—onto any surface covered by real or artificial turf.

Figure 1:
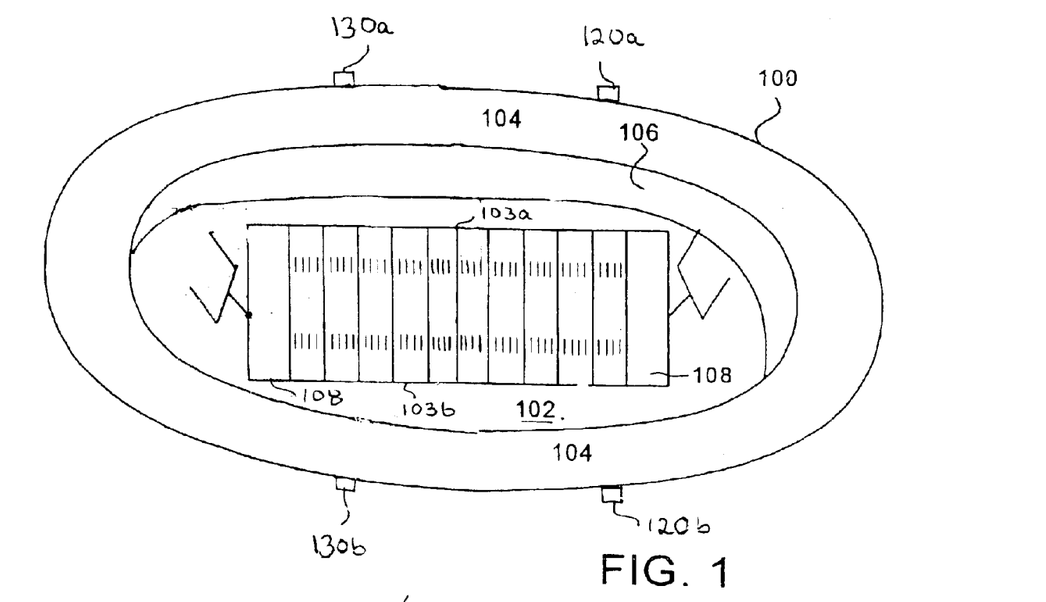
FIG. 1 is a perspective view of a football stadium equipped with a visible line marking system in accordance with an illustrative embodiment of the present invention.

FIG. 1 is a partial view of an exemplary stadium 100 having associated therewith a visible line marking system constructed in accordance with the teachings of the present invention. In the center of stadium 100 is an athletic field 102 covered with grass—which can be either real or artificial turf grass—and marked with a rectangular grid pattern to define a football playing area. The width of this grid pattern is delineated by, inter alia, first and second lateral boundary lines indicated generally at 103a and 103b, which are separated by a distance of approximately fifty-three yards. At regular increments of ten yards, eleven transverse reference lines extend across field 102, interconnecting first and second boundary lines 103a and 103b. Collectively, these transverse reference lines define the one hundred yard area of field 102 that separates the end zones 108 of each team.

Surrounding the grass-covered surface of football field 102 is a seating area, indicated generally at 104, designed to accommodate a large number of spectators. As will be readily appreciated by those skilled in the art, the seating area of a typical professional league football stadium can easily accommodate several scores of thousands of fans, and many college arenas provide seating for at least tens of thousands. In that regard, seating area 104 can consist of three or more distinct tiers as, for example, a lower deck, mezzanine, and upper deck area. Between seating area 104 and playing field 102 is a retaining wall 106, which serves as a barrier between the spectators and the players and officials on field 102. It goes without saying that the spectators expect a substantially unobstructed view, from any seat within seating area 104, of the action taking place on field 102.

A line marking system constructed in accordance with an illustrative embodiment of the present invention includes a first pair of laser sources indicated generally at 120a and 120b and a second pair of laser sources indicated generally at 130a and 130b. To ensure coverage of the entire length and width of the playing area, each laser source is positioned at a location that is high above the grass-covered surface of field 102—on the order of from about fifty to about two hundred and fifty feet or so depending upon the intensity, shape and divergence of the coherent beam generated and upon the availability of a suitable mounting location. Although it is certainly conceivable that certain enclosed (e.g., domed) environments might offer a mounting location that is directly above athletic field 102, each laser source as sources 120a and 120b is typically mounted well beyond lateral boundary lines 103a and 103b—on the order of, say, about fifty to one hundred and fifty feet outside lines 103a and 103b. In the exemplary embodiment of FIG. 1, for example, each laser source is positioned directly above seating area 104, with care being taken to ensure that the respective beams projected are sufficiently distant from the spectators at all times as to comply with the guidelines prescribed by the Center for Diagnostic and Radiological Health, a department of the U.S. Food and Drug Administration. The beam may therefore traverse a distance of hundreds of feet before reaching the surface of field 102, and may do so at an angle of incidence that is typically within a range of from about fifteen to about ninety degrees.

Under certain ambient lighting and other installation conditions, it is contemplated that a surface may be divided into multiple regions or zones. This allows the distance over which each beam must travel to be kept within a range that is consistent with the intensity, divergence and line width demands for proper viewing. By way of illustrative example in which the surface is a football field that is subject to daylight illumination conditions, first and second laser sources 120a and 120b may be positioned above opposite lateral sides of the 25 yard line to provide coverage for half the area of field 102—a region designated as area 102b in FIG. 3, while third and fourth laser sources 130a and 130b may be positioned opposite lateral sides of the 25 be yard line on the other half of the field, a region designated as area 102a in FIG. 3. Such an installation decreases the maximum angle, relative to the vertical, at which each beam strikes field surface 102. A beam emitted by laser source 120a from a point 200 feet above a lateral side of the 25 yard line will be disposed entirely in a vertical plane relative to horizontal target surface 102b, and thus at an angle of zero degrees relative to the vertical. A beam directed from that same source but along a selectable path 25 yards away (e.g., at the 50 yard line) will strike target surface at an angle of twenty degrees relative to the vertical. To be useful as an official line of demarcation in a football game, it is believed that the angle should be no greater than 20 degrees. This is because the tip of the football is three inches above the ground. In the foregoing example, the trailing edge of the visible composite line will cross the tip of the football about one inch in front of where it actually crosses the field. The greater the greater the angle, the greater the deviation.

Figure 2:
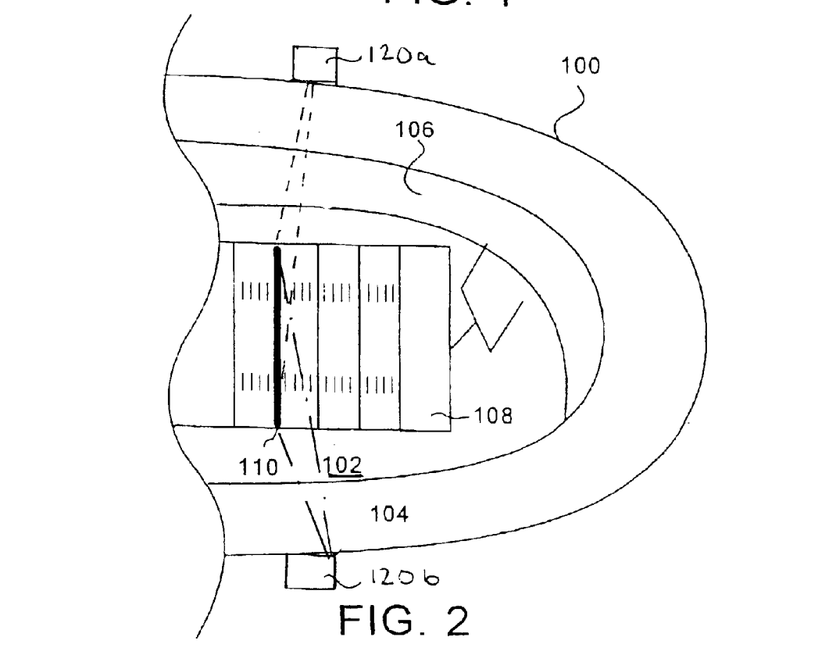
FIG. 2 is a partial perspective view of the football stadium of FIG. 1, depicting the projection of a visible line of demarcation (i.e., a "first down" line) onto a portion of the field surface covered by real or artificial grass.
Figure 3:
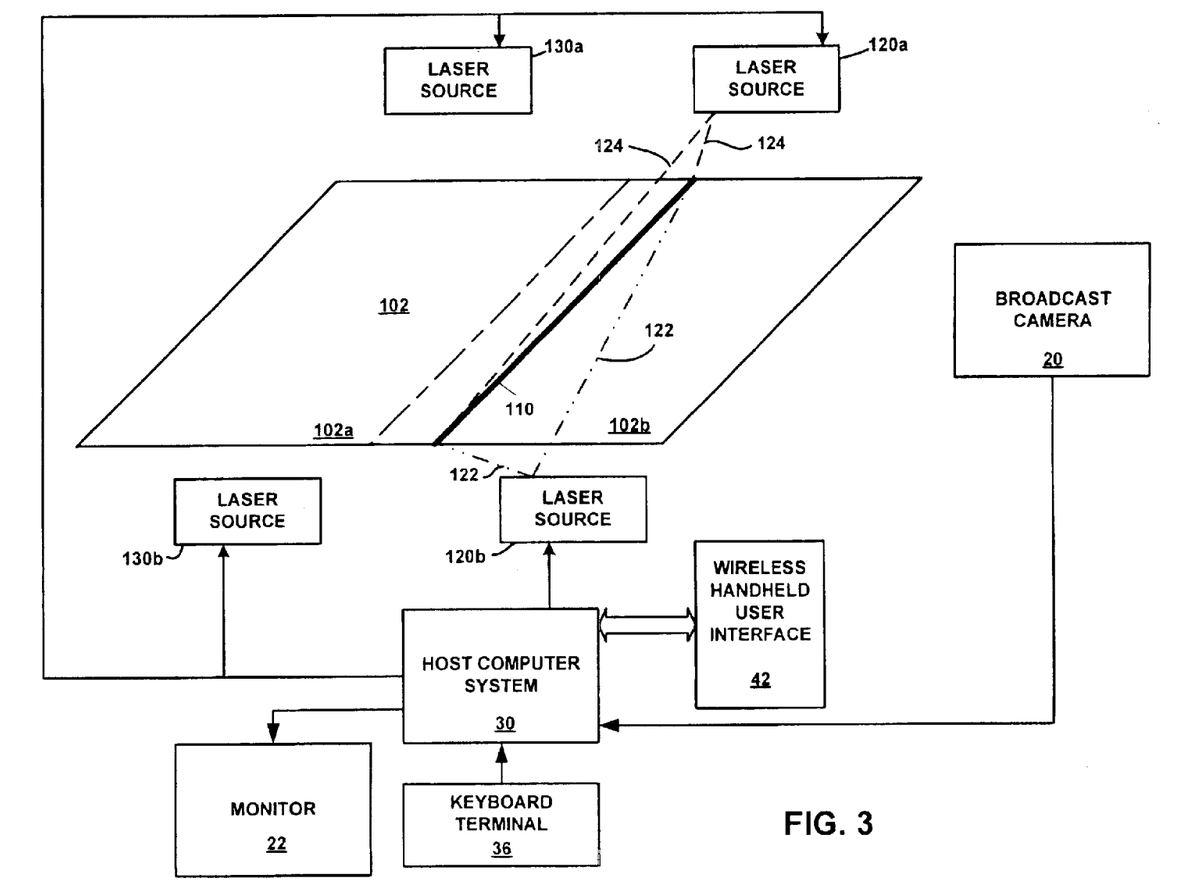
FIG. 3 is a block diagram schematically depicting the components of an exemplary visible line marking system employing two pairs of synchronized coherent laser sources.

As such, and in accordance with the illustrative embodiment of the present invention depicted in FIG. 1, each pair of laser sources is dimensioned and arranged within stadium 100 to provide coverage for only a portion of the entire of the field area. As best seen in FIGS. 2 and 3, laser sources 120a and 120b—in a manner to be described shortly—are operated together so as to jointly project, from two different angles, a composite visible line 110 onto the field region 102b. As indicated above, by appropriate beam wavelength, output power level selection, and placement of the multiple laser sources, the poor light scattering performance of the grassy field surface 102 can be overcome and spectators can easily see the line so-projected from most, if not all, vantage points within seating area 104 even in peak daylight ambient lighting conditions.

A simplified block diagram of an illustrative visible line marking system 10 constructed in accordance with the teachings of the present invention is shown in FIG. 3. Essentially, system 10 includes a plurality of groups of laser sources, of which only a first group (comprising first laser source 120a and second laser source 120b) and a second group (comprising third laser source 130a and fourth laser source 130b) are shown. It will readily appreciated by those skilled in the art that any number of intermediate groups of laser sources may be added, and the relative spacing between the sources of all groups adjusted, in order to ensure that the projected line 110 (FIG. 2) can be clearly seen from all desired viewing angles.

In this regard, the inventors herein have observed that the intensity of light reflected by grassy surfaces is subject to substantial local variations depending upon the vertical and angular position of the observer relative to the location where a laser beam strikes a region of the target surface. In locations where the amount of ambient illumination is relatively high such, for example, a stadium whose grass field is exposed to full sun or even bright incandescent lighting, light projected by a single coherent laser source is reflected by the randomly oriented blades of grass in such a way that it can be clearly seen from some seating locations and barely seen from others. In accordance with the present invention, the light from two or more beams, as beam 124 output by first laser source 120a and beam 122 output by second laser source 120b, are used in order to ensure that the light reflected by target surface 102b can be clearly seen from any viewing location.

With continuing reference to FIG. 3, it will be seen that the respective laser sources are controlled by host computer system 30, with which there are associated a monitor 22, a keyboard terminal 36, and a hand-held wireless interface 42. In the exemplary embodiment, the software controlling movements of the beams developed by each laser source is configured to allow line projection position and operation commands to be supplied by either keyboard terminal 36 or by wireless interface 42 (via an RF link). To make the most effective use of the capacity to implement line position commands using keyboard terminal 36, monitor 22 is configured to present a view (which may be an actual view taken by video camera or a digitally simulated scene) of football field 102. Alternatively, or in addition to the keyboard command capability, commands for position the visible line are entered by wireless interface 42 via an RF link. To prevent unauthorized interference with the proper operation of system 10, wireless interface 42 and wireless transceiver 43 are configured with the ability to encrypt and decrypt the signals exchanged over the RF link established therebetween. To ensure the operability of the system in a variety of pre-existing stadiums and arenas where certain wireless frequencies may already be assigned to use for other purposes, each of wireless interface 42 and wireless transceiver 43 is further equipped with a frequency selection switch by which the system installer/operator can choose an available, non-interfering transmission frequency from among a plurality of selectable frequencies.

With continued reference to FIG. 3, it will also be seen that field surface 102 (or any portion thereof) is within the view of at least one broadcast video camera indicated generally at 20. In accordance with the standard NTSC television interlaced format, the view is scanned at a rate of 30 Hz.

Typically, the scanning format is an array of 488(H) by 380(W) charge coupled device (CCD) pixels, each of which generates a voltage level proportional to the intensity of light on that pixel element. An NTSC camera converts this sequence of pixel outputs to a standard RS 170 composite video signal of 525 lines, two fields per frame, fully interlaced format with a resolution of 488 lines per frame by 380 elements per line.

Figure 4:
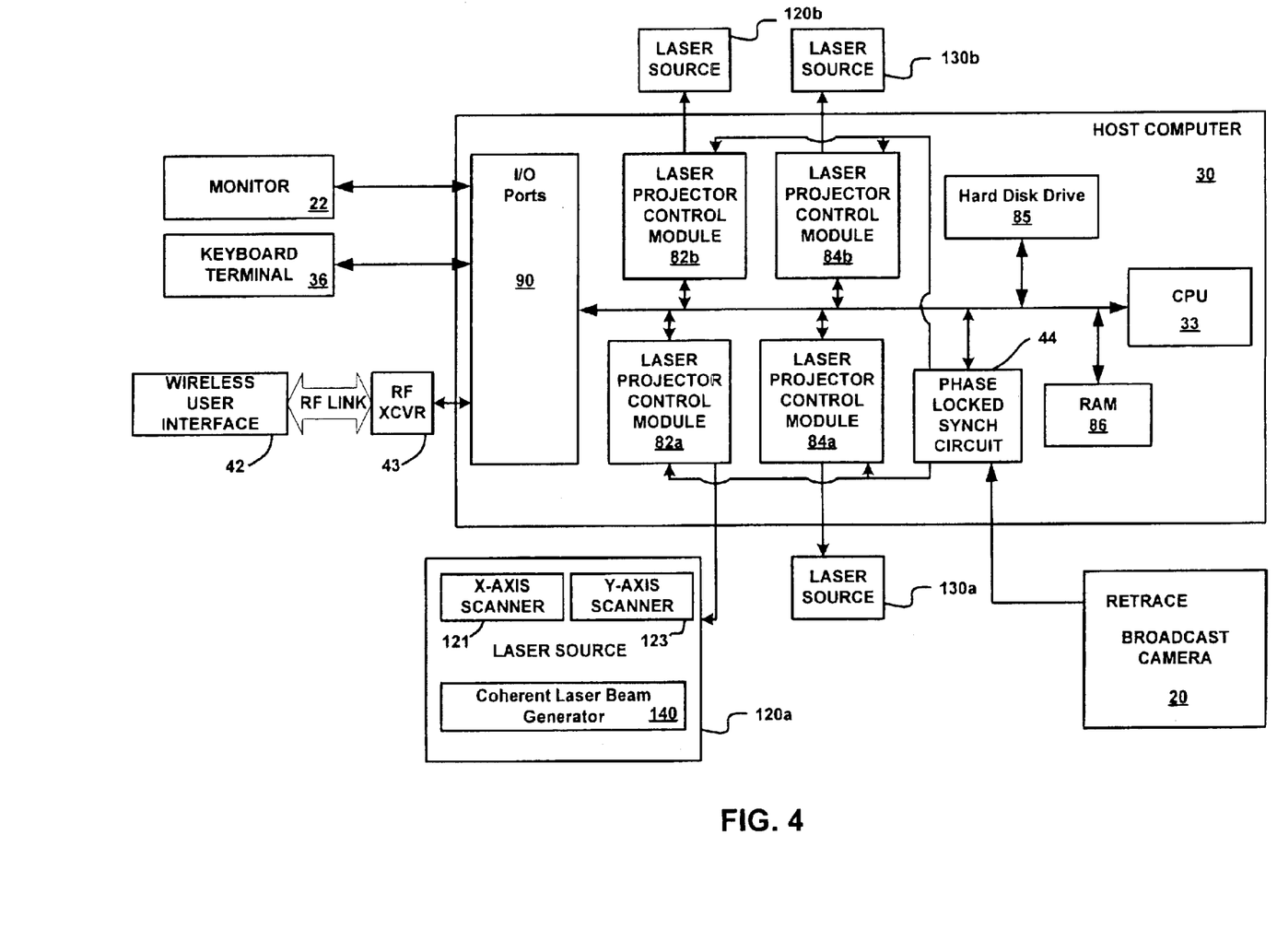
FIG. 4 is a block diagram depicting, in greater detail, the various functional elements of the exemplary visible line marking system of FIG. 3.

Turning now to FIG. 4, it will be seen that each laser source as source 120a comprises first and second galvanic scanners indicated generally at reference numerals 121 and 123, respectively.

Such scanners are found in conventional laser projectors, and as used therein, galvanic scanner 121 controls movement in the X-axis direction of a coherent laser beam developed by beam generator 140. Likewise, galvanic scanner 123 controls movement in the Y-direction. Considering the width direction of field 102 between boundaries 103a and 103b to constitute the Y-direction, a visible line is generated by causing beams 122 and 124 (FIG. 3) to move fast enough in that direction to create a composite temporary visible line at a desired location on target surface 16.

Essentially, a composite visible line is formed at a desired location by repeatedly and rapidly scanning target surface 102 with each of beams 122 and 124 such that each beam strikes target surface 16 at many points along a selectable path. An exemplary selectable path is identified by reference numeral 110 in FIG. 2, it being understood that a change in the specific location of the temporary visible line—in this case a straight line across surface 102b—is implemented through operation of the respective X- and Y-scanners of each of laser sources 120a and 120b. As will be readily appreciated by those skilled in the art, each scanner as scanners 121 and 123 includes mirror (not shown) that deflects the beam. Working together, scanners 121 and 123 are operative to direct the corresponding beam at any selectable point within coverage region 102b so as to thereby generate a temporary visible line thereon.

To enable accurate positioning of a visible line along a selected path as path 110 (FIG. 2), scanners as scanners 121 and 123 are preferably closed-loop galvanic scanners (also called "position detecting" scanners). Scanners of this type are commonly used in the laser light entertainment industry and are compatible with a wide variety of commercially available laser graphics software packages. Acceptable performance has been achieved using scanners that are capable of directing the beam to 24,000 to 30,000 discrete points along selected path 110 every second. Scanning assemblies suitable for use in the present invention have been assembled, for example, using two of Cambridge Technology's model 6800 scanners and matching model 6580 amplifier circuit boards.

As a safety precaution, each laser projector preferably includes a conventional shutter mechanism (not shown) such, for example, as an acoustic optical modulator (AOM) for turning off the beam in the event, for example, a malfunction prevents proper movement of each scanning beam. In the event system 10 may be called upon to create two or more distinct and unconnected visible lines, the AOM's may also be used to implement a blanking function whereby the beam is turned off as it moves between them.

Optionally, each laser source may further include a conventional beam expander (not shown) in order to increase the diameter of the beam or a conventional collimator (not shown) for altering its divergence. In a typical stadium installation, it is anticipated that laser sources as sources 120a and 120b will be mounted anywhere from about 75 to about 200 feet above the level of target field surface 102. Consequently, beams 122 and 124 will traverse a considerable distance before striking surface 102b. As will be readily appreciated by those skilled in the art, the need for expansion or collimation of beams 122 and 124 is purely a function of the initial beam diameter and the desired thickness of the visible line as formed on the target surface. A more challenging aspect of projecting beams over such distances, especially in full sun illumination conditions, is that of finding lasers capable of delivering coherent beams of sufficient power and intensity to form a visible composite line.

For a line width of approximately six inches (15 cm), excellent results have been achieved in a stadium environment (i.e., from distances in excess of several hundred feet) using two 40W, frequency doubled, Q-switched Nd:YAG lasers each adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to he human eye). Thus, an argon laser would theoretically have to deliver up to three or four times as much power to match the visibility of the Nd:YAG laser. Notwithstanding the relative difference in visibility, the inventors herein contemplate that one or more cw-mode lasers can be used in conjunction with one or more pulse mode lasers to provide a single, composite visible line, if desired. Moreover, and with particular regard to an illustrative embodiment that uses two laser sources to generate each visible line, it is also contemplated that the first laser source may be configured to deliver a beam which has a different power level than the second laser source, and that the respective power levels may be altered as necessary to compensate for different ambient lighting conditions.

The use of Nd:YAG lasers has heretofore been regarded as unsuitable for so-called laser graphics applications because they tend to produce dotted, rather than continuous lines. Advantageously, the use of two or more lasers in accordance with the teachings of the present invention overcomes this apparent deficiency by synchronizing the first and second laser sources such that segments of the broken pattern of elliptical spots produced by first laser source 120a overlap the broken areas between the elliptical spots produced by second laser source 120b. The resulting composite visible line appearing along selected path 110 thus appears to be continuous and unbroken to the human observer. If desired, a cylindrical lens can be used to define the appearance of each spot as a dotted line segment having a straight forward and trailing edge.

In any event, and with continuing reference to FIG. 4, it will be seen that the scanners associated with each corresponding laser source are controlled by a corresponding laser projector control module respectively identified by reference numerals 82a, 82b, 82c and 82d residing within host computer system 30. Acceptable results have been obtained using Pangolin QM2000 laser projection controller boards, available from Pangolin Laser Systems, Inc., Orlando, Fla. Essentially, each QM2000 board includes its own processor and memory storage resources, and is configured to execute a special software program (Pangolin LD2000) to directly control any ILDA-compliant scanner unit. A first of the projector control modules, control module 82a, is designated as a "master" controller and is configured to assign specific line projection tasks to the scanners (e.g., 121, 123) of its own associated laser source as well to those of the laser sources via "slave" projector control modules (e.g., 82b–82c). Utilizing the Pangolin LD2000 software package, it is possible to define a series of "scenes" each corresponding to a discrete position of the visible line to be projected.

Other components of host computer 30 include a conventional central processor unit as, for example, an Intel Pentium 4 2.0 GHz microprocessor unit, random access memory 86, a hard drive for storage of the operating system and communications program needed to define an interface between wireless user interface 42 and I/O ports 90 via radio frequency (RF) transceiver 43. A set of MIDI function commands input by local console 32 or wireless, handheld user interface 42 cause the program executing on master projector control module 82a to instruct an appropriate group of scanners to move the beams as needed to adjust the visible, composite temporary line from an initially selected position defined by a first "scene" stored in RAM of module 82a and corresponding to a selectable path as path 110 in FIG. 2, to a subsequently selected position defined by a second scene. Thus, for example, in the context of an illustrative football stadium installation, the temporary line may be moved from an initial line of scrimmage—where a game official has just "spotted the ball"—by a set distance of ten yards by the mere depression of a single pushbutton of user interface 42. This can also include moving the temporary visible line from an old line of scrimmage, forward or backward, to a new line of scrimmage as a result of a penalty assessed against one of the teams.

From the foregoing discussion it will be appreciated that system 10, as thus far described, is capable of creating temporary, visible composite lines which can be seen not only by players and game officials on the ground, but also by stadium audiences from distances in excess of hundreds of feet—despite the non-uniform light scattering properties of real and artificial grass. So long as the sweep frequency rate—the rate at which the visible line is refreshed by passing the beams across it—is at least thirty times per second, no flicker will be perceptible by the players, officials, or spectators present at the event. In order for the lines generated by system 10 to be properly seen by television audiences, however, it is necessary to synchronize the beam scanning process to the scan rate of the at least one television or video camera 20 having surface 102 within its field of view.

Assuming NTSC compliant operation, the sweep frequency rate must be an n multiple of the 30 Hz camera scan rate, where n is a whole integer greater than one (e.g., for n=2, the sweep frequency rate is 60 Hz). Since it is believed to be easier in most cases to trigger operation of the projector control modules rather than trigger the scan cycle of the broadcast video or television camera, an especially preferred embodiment of the present invention includes a phase-locked synchronization circuit 44 which synchronizes the operation of laser projection control modules 82a, 82b, 84a and 84b to the 60 Hz vertical blanking pulses of the video signal from broadcast camera 20. For a 30 Hz refresh rate, the 60 Hz vertical retrace output signal from camera 20 is coupled to a divide by 2 frequency divider (not shown).

Figure 5:
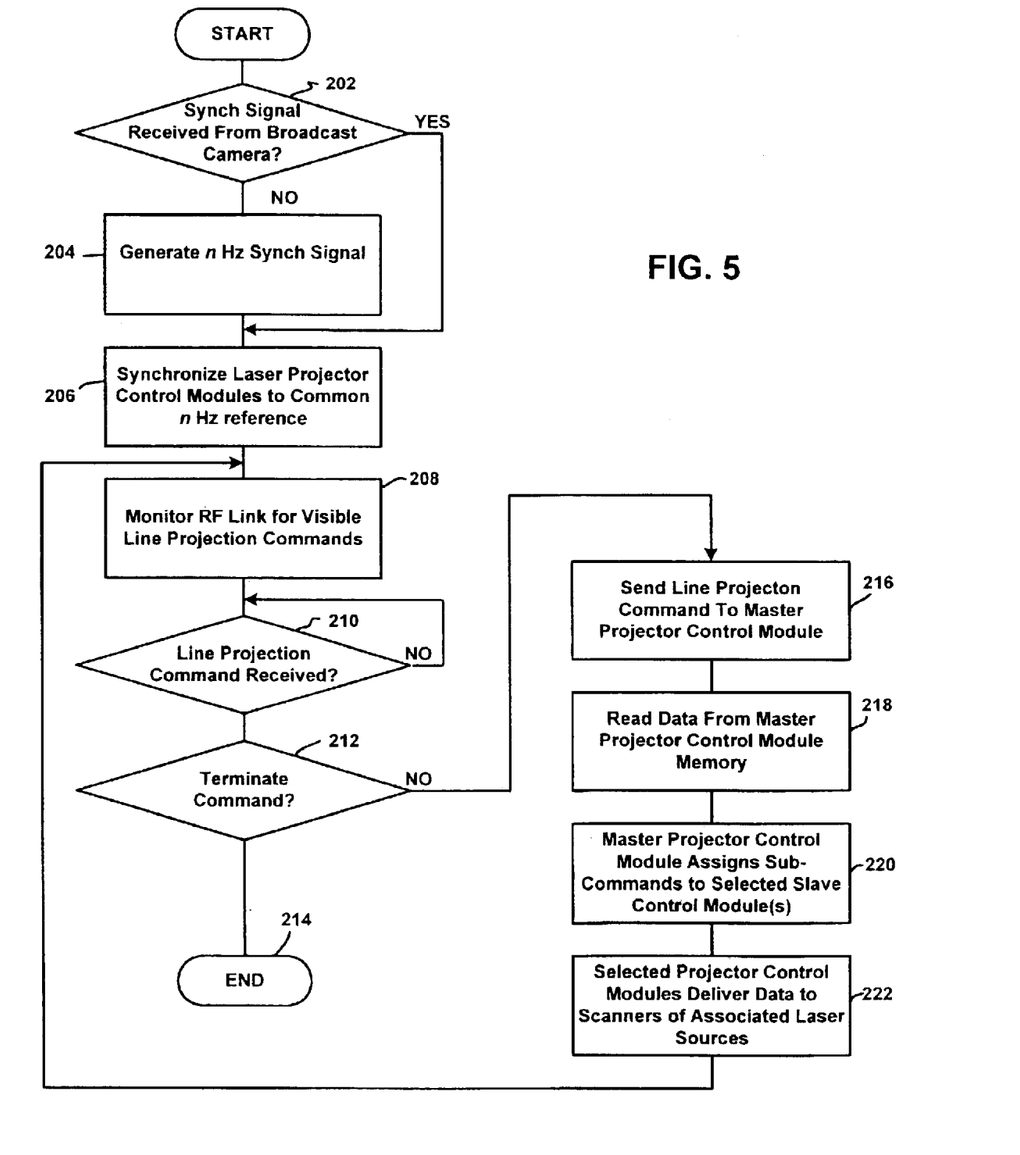
FIG. 5 is a flow chart depicting a sequence of operation for the exemplary system depicted in FIGS. 3 and 4.

With reference now to FIG. 5, an exemplary sequence of operating the illustrative visible line marking system depicted in FIGS. 1–4 will now be described. The process is entered at step 202 wherein a determination is made as to whether an n Hz synchronization signal is available from an external source such, for example, as a broadcast television camera. In most cases, the reference signal will be a 30 Hz or 60 Hz signal, though other n-multiples of 30 Hz are contemplated. If no reference signal is available, one is generated at step 204. Each laser projector control module is synchronized to the common reference signal so that all laser sources can be operated to sweep their associated beam across the field surface at the same precisely controlled rate (block 206).

Using a hand-held user interface, a game official enters commands instructing visible line system 10 as to the required location of dynamically movable line 110 (FIG. 2). An RF link between host computer 30 (FIG. 4) and this interface is continuously monitored for new line placement instructions (block 208). If a new line projection command is received (block 210), it is examined to determine whether it is a terminate command (block 212). If so, all line projection operations cease (block 214) and the process terminates. If not, the process proceeds to block 216 and a newly received line projection command is supplied to master projector control module. Using its own on board processing and memory resources, the master projector control module obtains scene information corresponding to the location of the visible line to be projected and an indication as to which slave projector control module(s) are required to operate the applicable laser sources (block 218). At block 220, sub-commands are supplied by the master control module to the appropriate slave projector control modules and these, in turn, deliver data to the scanners associated with the laser sources controlled by them. The process returns to block 208. Until a terminate command or new line projection command is received, system 10 projects the visible line at the location specified by the most recent projection command.

It will be readily appreciated by those skilled in the art that various modifications and enhancements are possible. For example, while the illustrative arrangements depicted herein use a number of discrete projector control modules each configured to directly control a single laser source, it is contemplated that the same functionality could be implemented by single, specially designed master projector control board configured to control all of the laser sources. It should also be emphasized that there is no requirement that any pair of laser sources, as first and second laser sources 120a and 120b, be located along a line transverse and perpendicular to the lateral sidelines of the field. Thus, for example, the first laser source might be outside the first lateral side of field region 102b at the twenty-yard line and the second laser source might be outside the second lateral side of region 102b at the thirty-yard line. Still another laser source of the same group might be outside the second lateral side of region 102b at the ten-yard line, such that all or any two laser sources of the group might be used to generate a visible composite line in accordance with the present invention.

Nor is their any requirement that the laser sources be located at the same elevated vertical position relative to the field. It suffices to say that it is considered to be within the level of skill of the ordinary artisan to obtain, whether empirically or by calculation, a juxtaposition of laser sources that is ideally suited to the specific lighting conditions and overall dimensions associated with any particular indoor or outdoor location.

It will be apparent to those skilled in the art that various modifications and variations can be 20 made to the present invention without departing from the spirit and scope of the invention. Thus, it is intended that the present invention cover the modifications and variations of this invention provided they come within the scope of the appended claims and their equivalents.

What is claimed is:

1. An apparatus for providing at least one temporary visible reference line on a non-smooth surface within the view of at least one video camera, comprising:

a first laser source disposed at a first elevated location relative to the surface, said first laser source being operative to emit a first laser beam having a wavelength of between 400 nm and 750 nm and to sweep said first laser beam along a selectable path upon the surface so as to form a temporary visible line thereon;

a second laser source disposed at a second elevated location relative to the surface, said second laser source being operative to emit a second laser beam having a wavelength of between 400 nm and 750 nm and to sweep said second laser beam across the selected path so as to form, with said first laser beam, a composite temporary visible line; and a controller comprising a synchronization module operatively associated with the first and second laser sources and adapted to synchronize a sweep frequency rate, at which said first laser beam and said second laser beam are swept across the surface, to a scan rate of at least one camera arranged to receive an image of the composite temporary line.

2. The apparatus according to claim 1, wherein said sweep frequency rate and said scan rate are both 30 Hz.

3. The apparatus according to claim 1, wherein said scan rate is a sub-harmonic of said sweep frequency rate.

4. The apparatus according to claim 1, wherein at least one of said first laser source and said second laser source includes a frequency doubled, Q-switched Nd:YAG laser adapted to generate laser pulses at a wavelength of 532 nm.

5. The apparatus according to claim 4, wherein said at least one laser source is adapted to generate a beam of up to at least 40W.

6. The apparatus according to claim 1, wherein each of said first laser source and said second laser source includes a galvanic deflector responsive to control signals received by the controller to perform sweeping of said first and second laser beams.

7. The apparatus according to claim 1, wherein said controller is responsive to user input commands to move the composite temporary line from a first selectable path on the surface to a second selectable path on the surface.

8. The apparatus according to claim 1, wherein said synchronizing module is adapted to synchronize the scan rate of the at least one camera to the sweep frequency rate of the first and second laser sources.

9. The apparatus according to claim 1, wherein said synchronizing module is adapted to synchronize the sweep frequency rate of the first and second laser sources to a scan rate of the first and second laser sources.

10. The apparatus according to claim 1, wherein the beam output by said first laser source is of a wavelength different than the beam output by said second laser source.

11. The apparatus according to claim 1, wherein the first laser source and the second laser source are located on opposite lateral sides of the surface.

12. The apparatus according to claim 11, further including a third laser source disposed at a third elevated, stationary location relative to the surface and at the same lateral side of the surface as said first laser source, said third laser source being operative to emit a third laser beam having a wavelength of between 400 nm and 750 nm and to sweep said third laser beam along a selectable path upon the surface;

a fourth laser source disposed at a fourth elevated, stationary location relative to the surface and at the same lateral side of the surface as said second laser source, said fourth laser source being operative to emit a second laser beam having a wavelength of between 400 nm and 750 nm and responsive to input signals received from the controller to sweep said fourth laser beam across the selected path so as to form, with said third laser beam, a composite temporary line, wherein said controller is adapted to synchronize a sweep frequency rate at which said third laser source and said fourth laser source sweep the surface of the athletic field to a scan rate of the at least one camera, and wherein said controller is adapted to select between operation of said first and second laser sources as a pair and operation of said third and fourth laser sources as a pair depending on whether a temporary line is to be formed within a first region of the surface or within a second region of the surface.

13. The apparatus according to claim 1, wherein said composite temporary line is a straight line having a length of about fifty three yards and a width of from about four to about eight inches.

14. The apparatus according to claim 1, wherein a visible line formed upon the surface by said first laser source is a first series of individual line segments and a visible line formed upon the surface by said second laser source is a second series of individual line segments, said first and second laser sources being operable to form collinear, offset line segments with overlapping edges, whereby said composite temporary line is visible as a contiguous solid line along a substantial portion of its length.

15. A method of projecting at least one temporary visible reference line onto a non-smooth surface characterized by a tendency to scatter incident visible light in random and non-uniform manner, comprising the steps of:

receiving, in a first receiving step, a first line projection command;

operating a first laser source and a second laser source each disposed at different locations above the non-smooth surface so as to project, across only a first portion of the non-smooth surface, only a single composite visible line in accordance with the first line projection command;

receiving, in a second receiving step, a second line projection command; and in a second operating step, operating the first and second laser sources so as to project, across only a second portion of the non-smooth surface, only a single composite line in accordance with the second line projection command.

16. The method of claim 15, further including a step of transmitting a signal representative of the first line projection command via a wireless link.

17. The method of claim 16, wherein the composite line projected during the second operating step is projected at a distance of about ten yards from where the composite line was projected during the first operating step.

18. The method of claim 15, wherein said first operating step includes operating said first and second laser sources to sweep at least two coherent beams each having a wavelength of from 400 nm to 750 nm across the first region of the surface at a rate of at least 30 Hz.

19. The method of claim 15, wherein the visible line projected during the first operating step has substantially the same length and width as the visible line projected during the second operating step.

20. The method of claim 19, wherein the visible line projected during each of the first and second operating steps has a length of about fifty three yards and a width of about from four to eight inches.

* * * * *